US011267081B2

(12) United States Patent
Anderson et al.

(10) Patent No.: US 11,267,081 B2
(45) Date of Patent: Mar. 8, 2022

(54) ALUMINUM WELDING FILLER COMPOSITION SUITABLE FOR FORMATION INTO WIRE USED FOR FUSION WELDING

(71) Applicants: Bruce E. Anderson, Littleton, CO (US); Stephen L. Anderson, Traverse City, MI (US)

(72) Inventors: Bruce E. Anderson, Littleton, CO (US); Stephen L. Anderson, Traverse City, MI (US)

(73) Assignees: Stephen L. Anderson, Traverse City, MI (US); Bruce E. Anderson, Littleton, CO (US)

(*) Notice: Subject to any disclaimer, the term of this patent is extended or adjusted under 35 U.S.C. 154(b) by 351 days.

(21) Appl. No.: 15/649,066

(22) Filed: Jul. 13, 2017

(65) Prior Publication Data
US 2017/0304958 A1 Oct. 26, 2017

Related U.S. Application Data

(63) Continuation of application No. 14/532,431, filed on Nov. 4, 2014, now abandoned.
(Continued)

(51) Int. Cl.
B23K 35/28 (2006.01)
C22C 21/08 (2006.01)
(Continued)

(52) U.S. Cl.
CPC .......... *B23K 35/288* (2013.01); *B23K 35/224* (2013.01); *C22C 21/06* (2013.01); *C22C 21/08* (2013.01)

(58) Field of Classification Search
CPC .............................. B23K 35/286; C22C 21/08
See application file for complete search history.

(56) References Cited

U.S. PATENT DOCUMENTS 3,306,717 A 2/1967 Lindstrand et al.
5,908,518 A * 6/1999 Hoffmann ............... C22C 21/06
148/440

(Continued)

FOREIGN PATENT DOCUMENTS

DE 1201562 B 9/1965
EP 0093178 11/1983
(Continued)

OTHER PUBLICATIONS

Davis, J. R. "Aluminum and Aluminum Alloys", ASM International, p. 41. (Year: 1993).*
(Continued)

*Primary Examiner* — George Wyszomierski
*Assistant Examiner* — Janell C Morillo
(74) *Attorney, Agent, or Firm* — Young Basile Hanlon & MacFarlane, P.C.

(57) ABSTRACT

This invention relates to the field of welding high strength aluminum structures, and more particularly to the alloy filler metal composition, its resultant microstructure, and the physical and mechanical properties which are obtained in the weld bead during fusion welding. A composition for producing small diameter aluminum welding filler metal wires having a chemistry comprising Si varying from approximately 0.3 to 0.9 wt. %, Mn varying from approximately 0.05 to 1.2 wt. %, Mg varying from approximately 2.0 to 7.0 wt. %, Cr varying from approximately 0.05 to 0.30 wt. %, Zr varying from approximately 0.05 to 0.30 wt. %, Ti varying from approximately 0.003 to 0.20 wt. %, and B
(Continued)

Alloy design considerations for fatigue strength varying from approximately 0.0010 to 0.030 wt. %, and a remainder of aluminum and various trace elements.

6 Claims, 14 Drawing Sheets

Related U.S. Application Data

(60) Provisional application No. 61/902,695, filed on Nov. 11, 2013.

(51) Int. Cl.
*C22C 21/06* (2006.01)
*B23K 35/22* (2006.01)

(56) References Cited

U.S. PATENT DOCUMENTS

| | | |
|---|---|---|
| 2003/0143102 A1 | 7/2003 | Matsuoka |
| 2006/0081687 A1* | 4/2006 | Mechsner ............ B23K 35/286 228/262.5 |
| 2010/0129683 A1 | 5/2010 | Lin et al. |
| 2012/0294757 A1 | 11/2012 | Kang |
| 2015/0132181 A1 | 5/2015 | Anderson et al. |

FOREIGN PATENT DOCUMENTS

| | | | |
|---|---|---|---|
| EP | 2913141 | | 9/2015 |
| JP | H03264637 A | | 11/1991 |
| JP | 2915497 B2 | * | 7/1999 |
| JP | 2003147497 A | * | 5/2003 |
| WO | 9917903 | | 4/1999 |

OTHER PUBLICATIONS

International Searching Authority, "International Search Report and Written Opinion," issued in connection with Application No. PCT/US2016/061606, dated Mar. 30, 2017, 23 pages.

Davis, J.R., "Aluminum and Aluminum Alloys", ASM International, 1993, p. 18-23, 59.

File History of U.S. Appl. No. 14/532,431, filed with the United States Patent and Trademark Office filed Nov. 1, 2014, 208 pages.

USPTO, "Non-Final Office Action," issued in connection with U.S. Appl. No. 14/532,431, dated Jan. 13, 2017, 11 pages.

* cited by examiner

FIGURE 1: Invention alloy approximate chemical analysis

|  | Si | Fe | Cu | Mn | Mg | Cr | Zn | Be | Zr | Ti | B | Each | Total |
|---|---|---|---|---|---|---|---|---|---|---|---|---|---|
| Alloy 1 | 0.50 - 0.70 | 0.20 | 0.10 | 0.05- 0.20 | 5.7 - 6.1 | 0.05- 0.20 | 0.10 | 0.0003 | 0.05- 0.15 | 0.003- 0.10 | 0.0010- 0.010 | 0.05 | 0.15 |
| Alloy 2 | 0.30 - 0.50 | 0.20 | 0.10 | 0.50- 1.0 | 3.4 - 3.7 | 0.05- 0.20 | 0.10 | 0.0003 | 0.05- 0.15 | 0.003- 0.10 | 0.0010- 0.010 | 0.05 | 0.15 |
| Invention Alloy | 0.1 - 0.9 | 0.50 | 0.50 | 0.05- 1.2 | 2.0 – 7.0 | 0.05- 0.30 | 0.30 | 0.0008 | 0.05- 0.30 | 0.003- 0.20 | 0.0010- 0.030 | 0.05 | 0.15 |

Note: Zr + Ti = 0.20 Max

ALLOY DEVELOPMENT
High strength 4xxx alloy filler wire

Note: AW - as welded
PWHT-A - post-weld heat treated and aged
O – annealed

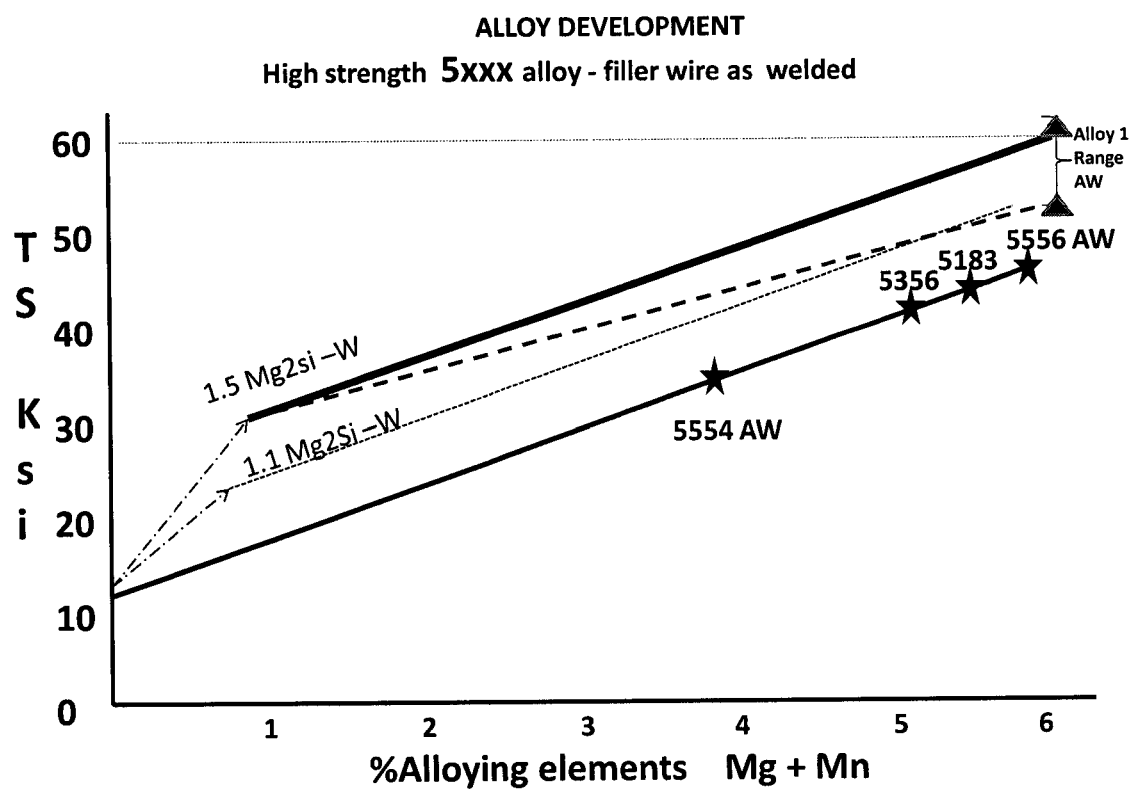
FIGURE 3: Properties of pure aluminum vs. aluminum with Mg2Si plus varying amounts of Mg + Mn alloying elements
Note: AW - as welded

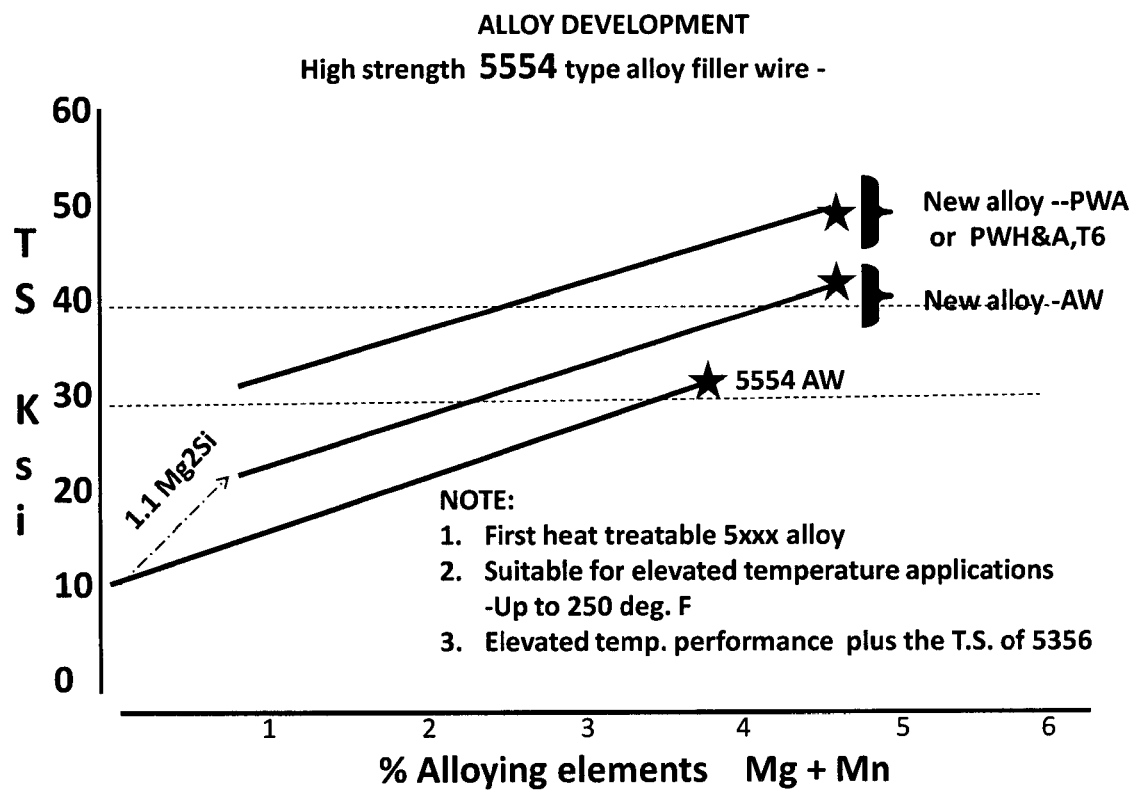
FIGURE 4: Effect of Mg2Si on 5554 type filler alloy
Note: AW - as welded
PWA - post-weld aged
PWH&A - post-weld heat treated and aged

FIGURE 5: Effect of alloying elements of conductivity/resistivity
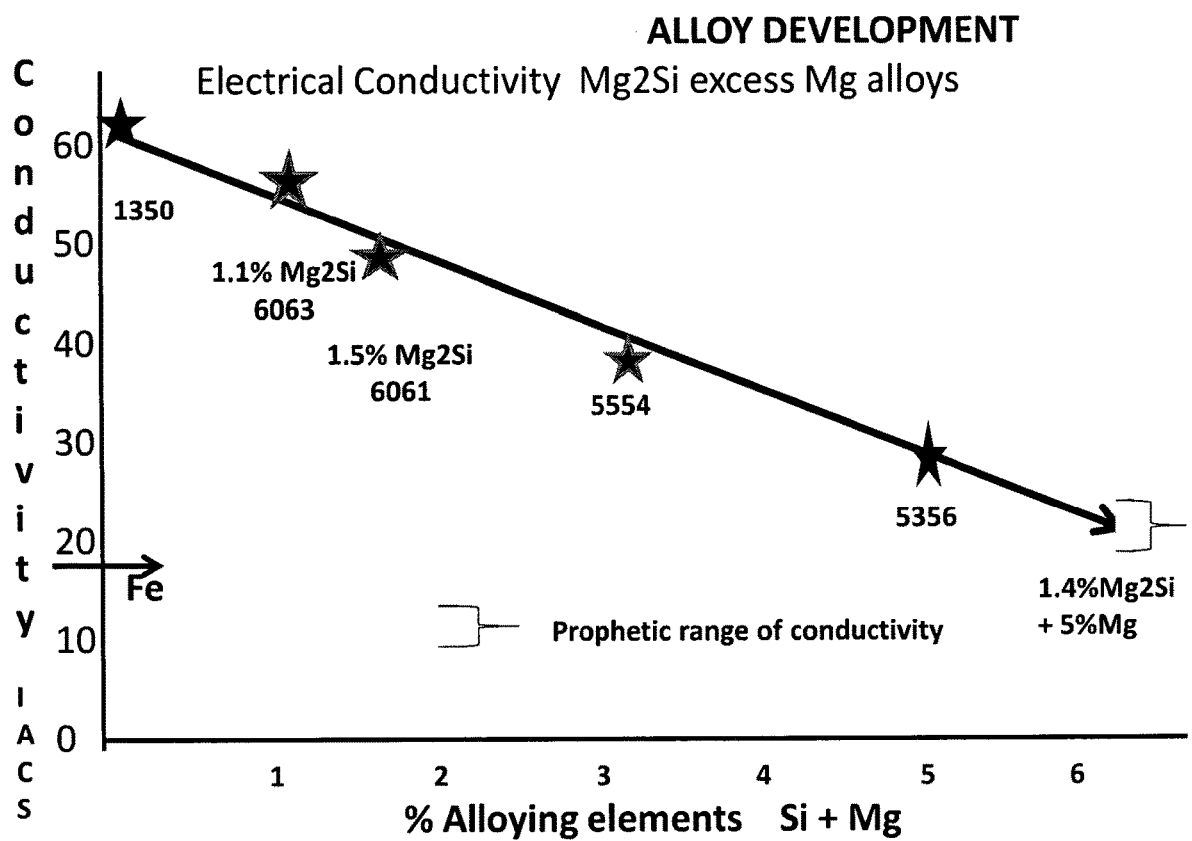

FIGURE 6: Effect of % Mg2Si on properties of welded aluminum

| Alloy Base Metal | | T.S. (ksi) | Y.S.(ksi) |
|---|---|---|---|
| Pure aluminum 1350 | -O temper | 10 | 4 |
| 0.8% Mg2Si (6063) | –T1 (wrought) | 22 | 13 |
| | -as welded | 20 | 10 |
| 1.4% Mg2Si (6061) | –T1 (wrought) | 35 | 21 |
| | -as welded | 30 | 16 |

NOTE: The effect of Mg2Si on base alloys is known. This knowledge gives support for the prophetic values used in providing tensile, yield and shear strength values for the new filler alloys as-welded and in post-welded thermally treated conditions.

FIGURE 7: Weld cooling rates for different heat inputs
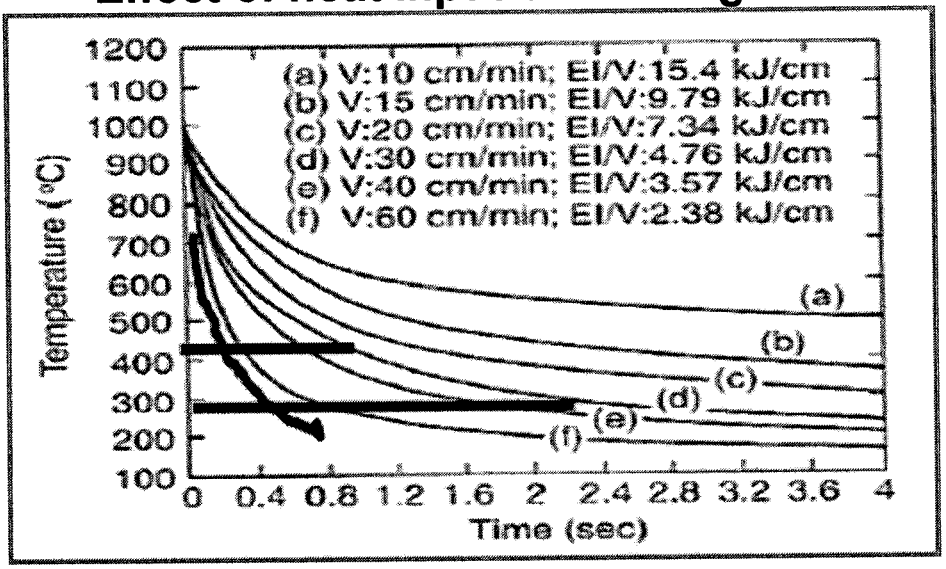
Conversion to Aluminum:
Typical Welding Heat inputs for Aluminum
Low         0.580 KJ/CM
Medium      0.750 KJ/CM
High        1.200 KJ/CM
Deg. F 800=C426
       500=C260
The bold curve shown is the typical cooling rate for aluminum welds.

FIGURE 8: Effects of Mg plus Mn when combined with Mg2Si on tensile, yield, and shear strength

Typical Properties

| Alloy | | | T.S. ksi | Y.S. ksi | Shear ksi |
|---|---|---|---|---|---|
| Pure aluminum 1350 | | -O | 10 | 4 | 6 |
| 4043 | 4.5% Si | -AW | 27 | 14 | 16 |
| 5554 | 3.5%Mg + Mn | -AW | 34 | 15 | 20 |
| 5356 | 5.2% Mg + Mn | -AW | 38 | 18 | 23 |
| 5183 | 5.4% Mg + Mn | -AW | 42 | 22 | 25 |
| 5556 | 5.7% Mg/Mn | -AW | 44 | 24 | 26.5 |
| 5087 | 5.7% Mg/Mn | -AW | 44 | 24 | 26.5 |
| Invention Alloy 1 (Prophetic typ.) | | -AW | 52 | 34 | 31 |
| | | -PWA | 58 | 40 | 35 |
| Invention Alloy 2 (Prophetic typ.) | | -AW | 40 | 20 | 24 |
| | | -PWA | 46 | 28 | 28 |
| | | -PWHT&A | 50 | 32 | 30 |

AW – as welded, PWA – post weld aged, PWHT&A - post weld heat treated and aged

Note 1: It is anticipated that invention alloys 1 and 2 will replace alloys 5356, 5183, 5554, 5556 and 5087. Specifically, alloy 2 will replace 5554 and 4xxx alloys for elevated temperature applications below 250 deg. F.

Note 2: Shear strength for design considerations is based on longitudinal shear direction and is 0.51 x the minimum allowable tensile strength of a filler alloy. The table shown above gives typical shear strength which is based on 0.6 x the typical tensile strength which is also listed.

FIGURE 9: Electro negativity of various solid solutes and individual constituents in aluminum.

| Solid Solute or Constituent | Potential Volts |
|---|---|
| 99.95 Al | -0.85* |
| Al + 1%Mg2Si | -0.83* |
| Al + 5%Mg | -0.88* |
| CuAl2 | -.073 |
| Al + 4%Zn | -1.05 |

*Considered to have similar potentials and excellent corrosion resistance properties.

Note: The electronegative potential values affect corrosion properties in welded aluminum alloy structures.

FIGURE 10: Alloy design considerations for fatigue strength
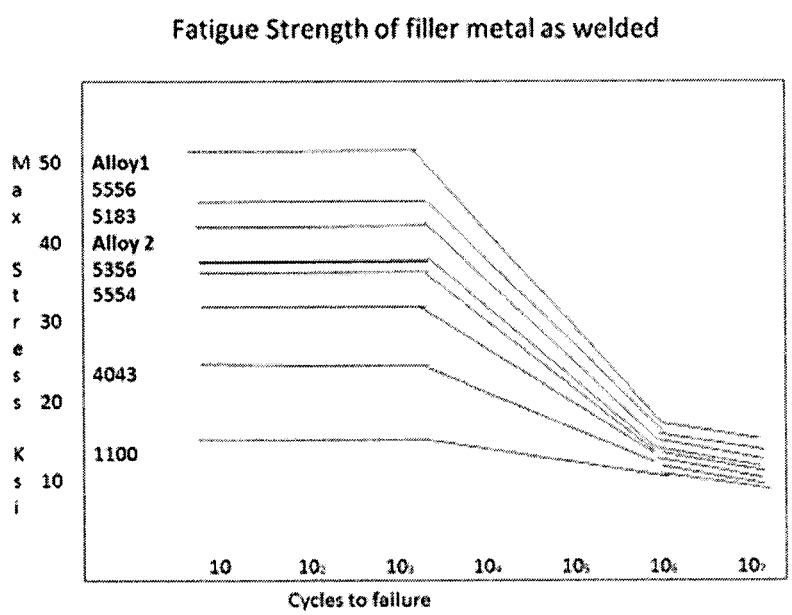

FIGURE 11: Alloy design considerations for toughness

| Alloy | Tear Resistance<br>Unit Propagation Energy | Notch Toughness<br>Ratio |
|---|---|---|
| 5356 AW | 1100 | 2.20 |
| 5183 AW | 1050 | 2.05 |
| 5554 AW | 1050 | 2.35 |
| 4043/4943 AW | 350 | 0.35 |
| 4943 PW HT&A | 100 | 0.10 |

Prophetic toughness values of the new invention alloy 1 as-welded and alloy 2 as welded or post-weld thermally treated.

| Alloy | Unit Propagation Energy | Ratio |
|---|---|---|
| ALLOY 1 AW | 1050 | 2.05 |
| ALLOY 1 PWA | 1050 | 2.00 |
| ALLOY 2 AW | 1050 | 2.20 |
| ALLOY 2 PWHT&A | 1050 | 2.05 |

Terms: Unit propagation energy - energy required to grow a crack in a welded structure.

Notch toughness - measures the effect of a notch on tensile & yield strengths.

Note: AW – as welded

PWA – post-weld aged

PWHT&A – post-weld heat treated and aged

Figure 12: Typical Fillet and Butt weld joints
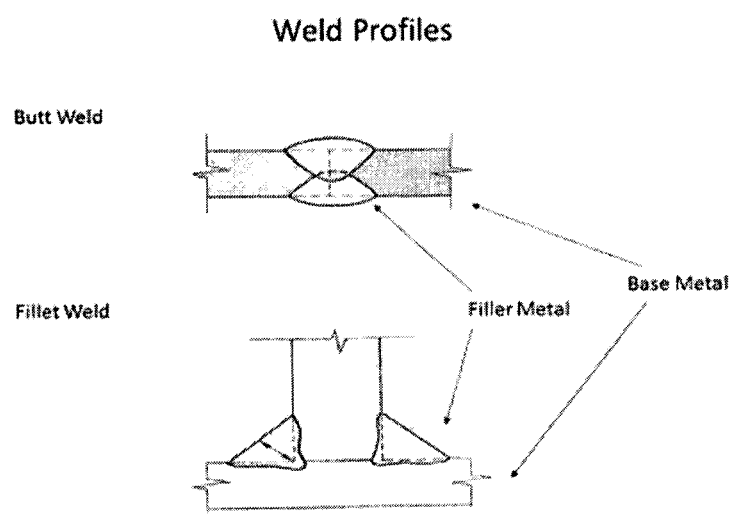

Figure 13: Fluidity in Aluminum Alloys
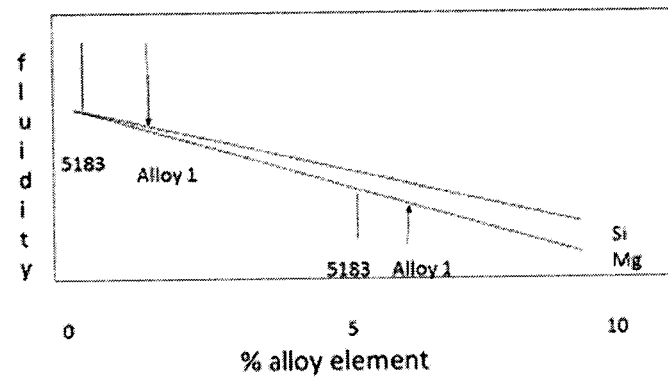

Figure 14: Surface Tension in Aluminum Alloys
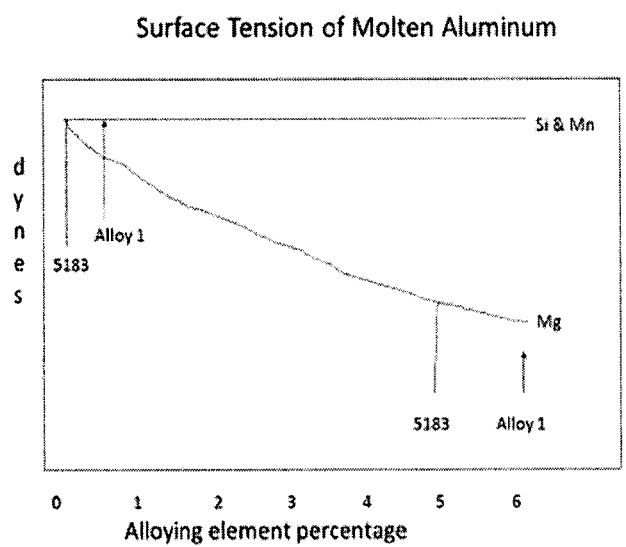

ALUMINUM WELDING FILLER COMPOSITION SUITABLE FOR FORMATION INTO WIRE USED FOR FUSION WELDING

CROSS-REFERENCE TO RELATED APPLICATIONS

This application is a continuation of U.S. patent application Ser. No. 14/532,431, filed Nov. 4, 2014, which claims the benefit of U.S. provisional patent application Ser. No. 61/902,695, filed Nov. 11, 2013, both of which are herein incorporated by reference in their entirety.

FIELD OF THE INVENTION

This invention relates to the field of welding high strength aluminum structures, and more particularly to the alloy filler metal composition the resultant microstructure, and the mechanical and physical properties obtained in the weld bead during fusion welding followed by post-weld thermal treatments.

BACKGROUND OF THE INVENTION

There are currently many types of welding processes used to join metal components. Some of these include Gas Metal Arc Welding (GMAW), Gas Tungsten Arc Welding (GTAW), Plasma Arc Welding (PAW), Electron Beam Welding, Inertia Welding, Friction Stir Welding and others. GMAW, GTAW, and PAW processes use filler metals to accomplish the weld joining process. Electron Beam Welding and the other processes mentioned here do not typically use filler metals to accomplish welding but they may in some instances. The filler metals developed here are applicable to all weld joining processes.

Arc welding is the most commonly used welding process in use today. It joins metal components by melting a portion of the base metal to be joined and melting a filler metal usually in the form of a wire to create a molten weld pool at the joint. The filler metals currently available for welding aluminum are subject to alteration of their mechanical properties during the welding process. The variables present during welding such as joint design, base metal section size, heat input, and penetration of the weld bead into the base metal with the resultant variation of the amount of base metal dilution into the filler metal puddle all affect the resulting mechanical and physical properties of the finished weld joint. These properties of the currently available filler metals for aluminum result in a severe limitation of the mechanical and physical properties of aluminum structures that can be consistently and reliably produced in modern manufacturing operations.

Welds in aluminum structures can fail under dynamic or static loading when in service. They can fail from many factors such as impact loading or fatigue. Failure in the weld joint is accelerated by discontinuities or structural defects that are often present in the weld joint. Therefore, it is important that the filler metal used to weld structural components have a higher mechanical strength than the base metals being joined so that failures, if they are to occur, are directed to the base material where there are far fewer discontinuities. The aluminum welding filler metals available today frequently do not provide that mechanical strength advantage and consequently weld joints become the weak links in aluminum welded structures. Welding design engineers are constantly seeking welding filler metals with higher as-welded strength to improve the life of their welded structures and provide additional degrees of safety for their welded products.

Aluminum filler metals have been developed since the invention of arc-welding processes. The popular aluminum filler metals in use today were developed to weld specific wrought or cast alloys simply by slightly modifying the composition of the base metals to be joined. For the 5xxx series filler metal alloys, these modifications were mainly done by adjusting base metal chemistries in order to achieve a filler metal chemistry that compensates for burn-off of certain alloying elements, such as Mg, in the welding arc. Most of the 4xxx series filler metal alloys were created by adapting already existing brazing alloys. The resulting filler metals have severe limitations in their ability to provide consistent reliable mechanical and physical properties in welds when subjected to the many variables present in the welding process.

There is a desire in the aluminum welded structures industry to have weld filler metals that not only produce superior strength but also provide superior corrosion resistance and that match the base metals for anodizing color of the base metal when anodized after welding. It is important to design aluminum welding filler metals that have the corrosion resistance and anodizing characteristics that are desired.

Heat generated by fusion welding processes and in particular arc welding of aluminum has always been a negative to be dealt with. Heat causes deterioration of the mechanical and sometimes the physical properties of both the weld joint and the heat effected zone of the base metal. This is true for both heat treatable and non-heat treatable aluminum alloys. None of the currently available aluminum filler metal alloys has its metallurgy specifically formulated to develop as-welded mechanical and physical properties that exceed the properties of the base metal in all welding conditions. To achieve this, the metallurgy of the alloy has been designed to take advantage of the unique sequence of thermal events that takes place in the welding process, namely that of melting, rapid solidification, and cooling rate. These cooling rates are fast enough to meet the time-temperature-transformation limit of the invention filler metal alloy to obtain the microstructure required in the weld bead to produce the desired mechanical and physical properties on a consistent and reliable basis.

The chemical composition of filler metals that are to be used in the form of wire or rods must have the mechanical properties that allow it to be fabricated into wire. This has been a limiting factor in developing higher strength 5xxx series filler metal alloys and is specifically addressed in this invention alloy.

The rapid advancement in the use of aluminum to produce automobiles, trucks, trailers, high-speed trains, rail cars, ships, military vehicles, rockets, missiles, satellites and many other products, demands the development of new filler metals with increased mechanical and superior physical properties to meet the demands of these products.

SUMMARY OF THE INVENTION

This invention consists of an aluminum alloy composition comprising Si in a weight percentage of between approximately 0.3 and 0.9 inclusive, Mn in a weight percentage of between approximately 0.05 and 1.2 inclusive, Mg in a weight percentage of between approximately 2.0 and 7.0 inclusive, Cr in a weight percentage of between approximately 0.05 and 0.30 inclusive, Zr in a weight percentage of between approximately 0.05 and 0.30 inclusive, Ti in a weight percentage of between approximately 0.003 and 0.20 inclusive, and B in a weight percentage of between approximately 0.0010 and 0.030 inclusive, Fe in a weight percentage maximum of 0.20, Cu in a weight percentage maximum of 0.10, Zn in a weight percentage maximum of 0.30, and Be in a weight percentage maximum of 0.0003 with a remainder of aluminum and trace elements with trace elements in a weight percentage maximum of 0.05 each, in a combined total maximum of 0.15%. Except for the trace elements with a single maximum allowable percentage, the balance of the elements present in this new alloy composition have been intentionally added and controlled with specific percentage ranges in order to achieve the design allowable property specifications of this alloy. The reason for the presence and percentage content of each of the intentionally added alloying elements is as follows:

- A. Silicon—The Si range of the alloy composition of between 0.3% and 0.9% by weight, allows for the formation of Mg2Si in amounts that will remain in solid solution at the quench rates present during typical welding operations. The alloy is designed to maximize elemental Mg and Si that are in solution in solidified weldments.
- B. Manganese—The Mn range of the alloy composition of between 0.05% and 1.2% by weight, enhances mechanical properties through elemental solid-solution strengthening and is controlled to prevent reduced ductility and toughness. The addition of Mn increases mechanical properties when controlled to below its maximum solubility limit in aluminum. It provides added strength without reduction of corrosion resistance in salt water applications.
- C. Magnesium—The Mg range of the alloy composition of between 2.0% and 7.0% by weight, allows the formation of Mg2Si in the amount that remains in solid solution at the quench and subsequent cooling rates, present during typical welding operations. Further, the excess Mg then stays in elemental solid solution to provide the desired mechanical and physical properties.
- D. Chromium—The Cr range of the alloy composition of between 0.05% and 0.30% by weight, is added to control grain structure. This range improves corrosion resistance and toughness. Above 0.35%, Cr forms coarse constituents with other impurities or additions such as Mn, Fe, Zr or Ti.
- E. Zirconium—The Zr range of the alloy composition of between 0.05% and 0.30% by weight is controlled to improve the resistance to solidification cracking in weldments.
- F. Titanium and Boron—The-Ti and B ranges of the alloy composition with the-Ti range of between 0.003% and 0.20% by weight and the B range of between 0.0010% and 0.030% by weight are used in combination to control grain structure size and shape in the weld bead during welding. This solidified structure in the weld bead improves stress corrosion cracking, toughness, and ductility. However, Ti tends to form coarse constituents with Cr. With the addition of very small amounts of B, the Ti coarse constituents are minimized without the loss of its grain refinement effects.
- G. Zirconium+Titanium—Zr plus Ti has a limit set in the alloy composition of 0.25% maximum. Zr, Ti, B, and Mn form coarse constituents with Cr. In coarse Cr constituent calculations, Zr and Ti are the greatest negative contributors in constituent formation that takes place with Cr. Therefore, Zr plus Ti has been controlled with a combined maximum amount.

This new alloy replaces the currently available welding filler metal alloys 5554, 5356, 5183, and 5556 for all applications. It provides welds that have significantly higher as-welded mechanical properties. Its higher tensile, yield, shear, and fatigue strength allows aluminum to be used in new higher strength applications. It allows currently designed welded structures to experience fewer structural failures in service.

In accordance with another aspect of the invention, a preferred embodiment referred to as alloy 2 in FIG. 1 is provided for welding the corresponding Cu free 3xx, 5xx, & 7xx casting alloys and alloy 5454 as well as other 3xxx, 5xxx or 6xxx series alloys intended for use at elevated temperatures up to 250 degrees F. This alloy composition provides higher tensile, yield, shear, and fatigue strengths for elevated temperature applications than filler alloy 5554. It allows currently designed welded structures, used at elevated temperatures, to experience fewer structural failures in service. This alloy is capable of welding silicon based casting alloys to wrought alloys with less than 3% Mg. In complex designs such as automobile or truck structures, where silicon based castings are welded to wrought alloys with less than 3% Mg, there are currently only two choices of filler metal available. The choices are a low strength 4xxx series filler metal alloy or 5554 filler metal. This alloy will allow welding of silicon based aluminum casting to wrought 6xxx and 5xxx series alloys with significantly higher mechanical properties in the weld joint.

This 6xxx series aluminum welding wire composition can be used to weld the 3xxx, 5xxx, 6xxx, and 7xxx series aluminum alloy components. Specifically designed into this alloy, is the ability to post-weld thermally treat weldments. It can be post-weld aged. Historically, only some 4xxx series filler metals would respond to post-weld thermal treatments when welding 6xxx series alloys and the resultant welds have very low fracture toughness with high crack growth sensitivity. This loss of toughness of the 4xxx filler metals has precluded the use of 6xxx series alloys in many welded applications where toughness and fracture characteristics are important design criteria. This 6xxx series alloy has significantly higher toughness than any 4xxx filler alloy as welded and can be post-weld aged. All 4xxx series alloys experience a significant loss of toughness with post-weld thermal treatments. This invention addresses this limitation of the currently available families of aluminum welding alloys. If mechanical properties and fracture toughness can be greatly increased, the size of weld beads in existing structures can potentially be reduced to achieve a cost savings in welding filler material and increased welding speeds.

In addition, this, alloy provides other advantageous welding performance properties such as electrode burn-off rate, cold metal short-arc transfer, bead droplet performance in the welding arc, improved weld bead penetration, or improved fluidity of the weld filler metal etc. The ability to adjust these welding parameters, and characteristics of the filler metal affects the shielding gas that is required to achieve desired end results and can result in substantial cost savings.

The invention alloy composition provides an aluminum welding filler metal comprised of a spooled or a linear wire cut to length, or any other electrode or filler metal shape that is to be melted and fused to aluminum alloy components that are to be joined together by welding. This invention is intended to cover all new methods of weld joining where a filler metal is utilized or where a layer of bonding metal is used between aluminum alloy components and is subsequently melted to join them.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying photographs, the latter being briefly described hereinafter.

BRIEF SUMMARY OF THE DRAWINGS

The description herein makes reference to the accompanying drawings wherein like reference numerals refer to like parts throughout the several views and wherein:

Some of the metallurgical and mechanical aspects of this invention are best illustrated through the use of graphical representations of the principals involved. Several graphs and charts have been included to illustrate the critical elements of this invention.

FIG. 1 is a table showing the chemical composition of the invention alloy along with two preferred embodiments.

FIG. 3 is a graph showing the tensile strength of various 4xxx series alloy filler metals as it varies with increasing percentages of its alloying elements.

FIG. 4 is a graph showing the typical tensile strength of as-welded 5554 along with a range of tensile strengths that the invention alloy is capable of producing as welded and when post-weld thermally treated.

FIG. 5 is a graph showing the Electrical Conductivity of various aluminum alloys as it is affected by the percentage of alloying elements Si and Mg.

FIG. 6 is a table showing the typical tensile strength of two aluminum alloys 6063 and 6061 as the content of Mg2Si is increased. The effects of increasing Mg2Si on the mechanical properties of a weldment are illustrated.

FIG. 7 is a chart showing weldment cooling rates for varying welding heat inputs.

FIG. 8 is a table showing the typical solid-solution strengthening provided by the increasing combination of Mg plus Mn when alloyed into a relatively pure aluminum matrix without Si present. It also shows the impact of including Mg2Si precipitates in pure aluminum along with free Mg and Mn. The chart shows the typical shear, tensile, and yield strengths of various aluminum filler metal alloys including the properties of the invention alloy.

FIG. 9 is a chart showing the electronegative potential of various solid solutes and constituents in aluminum alloys. FIG. 10 is a chart showing the welded fatigue strength of various aluminum alloys. FIG. 11 is a chart showing the toughness of various aluminum alloys welded with various popular aluminum weld filler alloys.

FIG. 12 is a drawing showing a typical fillet weld and butt weld joint. FIG. 13 is a chart showing the effect of increasing alloy content on the fluidity of aluminum alloys. FIG. 14 is a chart showing the effect of increasing alloy content on the surface tension of aluminum alloys.

DETAILED DESCRIPTION OF THE ILLUSTRATIVE EMBODIMENT

Figure 2:
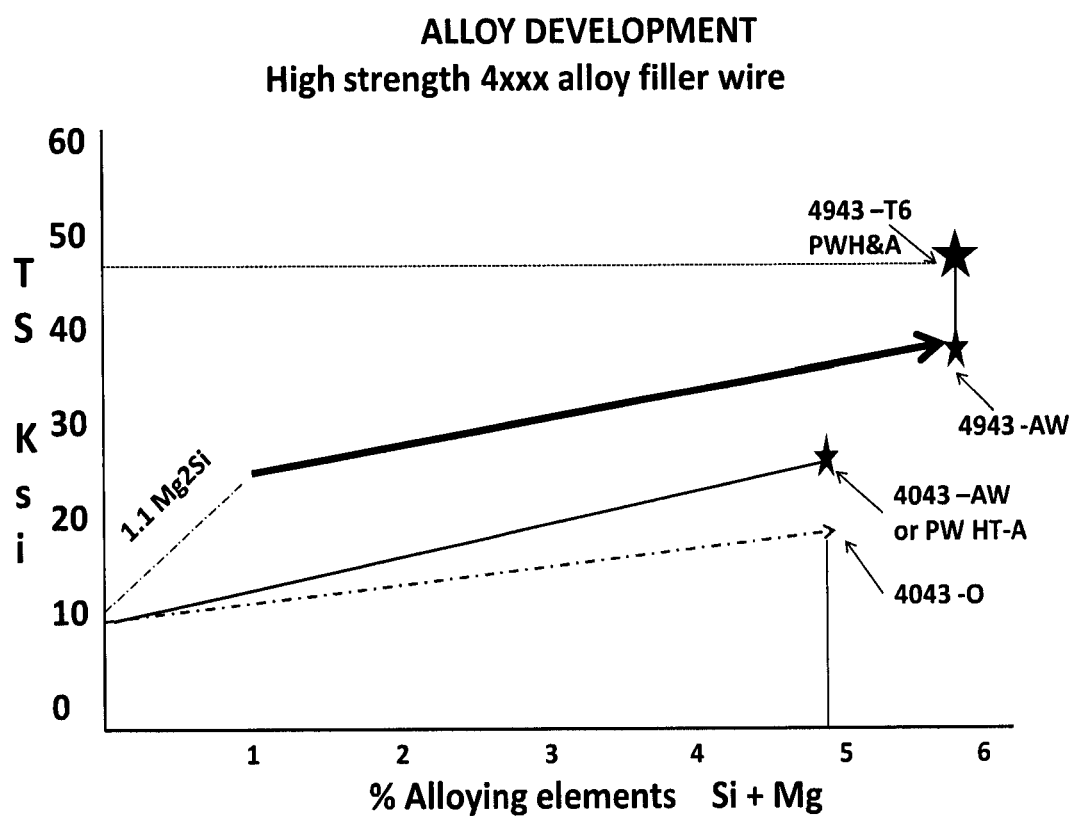
FIG. 2 is a graph showing the tensile strength of various 5xxx series filler metal alloys as it varies with increasing percentages of the alloying elements Mg and Mn in combination. Included on this graph is a band of properties that are achievable with the invention alloy composition depending on the chemical compositions chosen within the allowable limits and the properties that are achievable as-welded or in various states of thermal treatment.

Historically, welding filler metal alloys for aluminum have been developed by simply adapting the chemistries of already existing brazing alloys or by slightly modifying the chemistries of the cast or wrought alloys to be welded. In the case of the 4xxx series of welding alloys, most were adaptations of pre-existing brazing alloys. In the case of the filler metal alloys for welding cast alloys, they are simply a replication of the chemistry of the cast alloys to be welded with some modifications for elements that will burn off during welding. In the case of the 5xxx series filler metal alloys, they also are a slightly modified chemistry of the 5xxx series wrought alloys to be welded. Consequently, welding engineers struggle to produce welds where the strength of the weld joint significantly exceeds the strength of the base metals being welded. Because of the mechanical defects that are inherently present in all weld joints, it is critical for dynamically and in some cases statically loaded structures to have the strength of the weld joints exceed the strength of the base metals being joined. This becomes particularly critical in fillet welds and in partially penetrated butt-joint welds (See FIG. 12 for pictures of a typical fillet and butt weld joint). It is estimated that in general manufacturing operations, approximately 70% of all welds end up with partial penetration. In these cases, the weld metal bears all of the stress loads when in service. It becomes critical that weld joints have superior strength and toughness if welded structures are to meet their designed service life. This invention addresses this limitation of the currently available families of aluminum welding filler metal alloys.

Heat generated during the welding process has always been a negative. Heat deteriorates the properties of the base metal in the heat affected zone. Until now, there have not been any alloys registered with the Aluminum Association for welding or listed in the AWS A5.10 filler metal specification for aluminum that have been specifically designed to optimize their mechanical and physical properties by utilizing the thermal processes that are present in GMA and GTA welding operations. Additionally, when attempts have been made to produce higher strength 5xxx series welding filler metals they have been limited because, as the strength of the alloys was increased through maximizing Mg and Mn additions, the alloys very rapidly reached the point where the ductility of the alloy was lowered such that they could no longer be fabricated into welding wire or rods. The chemistry of the 6xxx series welding filler metal alloy of this invention was designed so that it could be thermally processed in such a way as to allow the alloy to be drawn into welding wire of the popular sizes. Next, the chemistry was designed so as to achieve maximum potential mechanical properties during the melting, rapid solidification, and subsequent cooling to room temperature of the weld joint. It was also a design objective to adjust the free Mg content in the alloy so that it could be used to weld 5454 and other base alloys that are used in elevated temperature applications up to 250 degrees F. Finally, this new 6xxx series filler metal alloy can be used to weld the 6xxx series wrought alloys and be responsive to thermal treatments such that after post-weld thermal treatment operations, the strength of the filler metal exceeded that of the 6xxx series base metals being welded without a loss of toughness.

Aluminum alloys are divided into two categories, heat treatable and non-heat treatable. The 6xxx series alloys are heat treatable. The principal strengthening mechanism in these alloys is achieved through dissolving Si and Mg into solution through a solution heat treatment operation, then quenching to lock them in solution at room temperature. The alloy is then artificially aged at elevated temperatures to precipitate out Mg2Si as coherent homogeneously dispersed particles that stress and thereby strengthen the microstructure. Non-heat treatable alloys such as the 3xxx, 4xxx and 5xxx series alloys achieve their mechanical properties through solid solution strengthening of the dissolved alloying elements, primarily Mn in the case of 3xxx series alloys, Si in the case of the 4xxx series alloys and Mg plus Mn in the case of the 5xxx series alloys. These alloys achieve additional strength through cold working operations. However, in the as-welded condition the 3xxx, 4xxx, and 5xxx series filler metals obtain their strength solely by solid solution strengthening of their principal alloying elements since no cold working is done after welding.

In the invention alloy composition, Mn is used in very limited amounts, when in the presence of higher magnesium contents, since it quickly creates a microstructure that results in brittle fracture when the extreme levels of cold work required to fabricate wire is encountered. Cu content is closely controlled in the base metal composition to reduce quench sensitivity during welding.

The 4xxx series welding filler metals cannot be used to weld the high strength 5xxx series base metal alloys and they have limited use for welding the high strength 6xxx series base metals due to their high Si content and low toughness properties.

The currently available 5xxx series weld filler metal alloys contain Mg and Mn as the principal alloying elements and contain no intentional additions of Si. FIG. 3 shows the effect of increasing additions of Mg and Mn. on the tensile strengths of the 5xxx series welding filler metal alloys. In the as-welded condition, they rely solely on the solid solution strengthening provided by Mg and Mn. No free silicon is present in the microstructure. FIG. 8 shows the effect of adding Si to form Mg2Si in combination with Mg and Mn resulting in increased tensile and shear strengths.

In the 6xxx series of wrought alloys, the alloying elements of Si and Mg are carefully formulated to produce Mg2Si in the final microstructure with little or no excess Si or Mg present after the final fabrication and heat treatment operations are completed.

The strengthening mechanism of the combination of Mg2Si with the addition of excess Mg at varying levels in the invention alloy composition was chosen to achieve the desired properties in the welding filler metal of this invention. The maximum solid solubility of Mg2Si in aluminum is 1.85%. In the 6xxx series alloys varying amounts of Mg2Si are used to achieve their mechanical properties (See FIG. 6). For this invention, various levels of Mg2Si have also been chosen to achieve the desired as-welded properties after welding the 5xxx series alloys and to achieve the desired as-welded and post-weld thermal treated properties desired when welding the 6xxx series alloys. The presence of Mg2Si that exceeds the solubility limit of 1.85% manifests itself in the as-welded microstructure as large particles of heterogeneous Mg2Si that do not respond to thermal treatments and have the other undesirable attribute of tying up excess Mg and not allowing it to be available for solid solution strengthening of the matrix. It is also known that Mg present in solid solution lowers the solubility of Mg2Si from the 1.85% level in pure aluminum. Therefore, the range of levels of Mg2Si in the new filler metal alloy composition was conservatively chosen in order to avoid producing excess Mg2Si that would be out-of-solution in the as-welded or post-weld thermally treated microstructures.

In the invention alloy composition, the limits of Si content are set at approximately 0.3% to 0.9% by weight, the limits of Mn content are set at approximately 0.05% to 1.2% by weight and the limits of Mg content in the invention alloy are set at approximately 2.0% to 7.0% by weight. In the invention alloy composition, the Mg2Si content is set at approximately 1.1% to 1.5% by weight. These levels avoid the problems of producing excess Mg2Si when significant levels of excess Mg are present. The ratio by weight of Mg to Si in Mg2Si is 1.73 to 1 and this ratio is used to calculate the proper alloy addition levels of Mg and Si.

The invention alloy composition was designed specifically to take advantage of the thermal processes present during welding operations. In both GMA and GTA welding processes, the filler metal is melted and solidified very rapidly with the time frame being generally less than two seconds and most commonly less than 1 second. See (FIG. 7). This invention was designed to utilize the rapid liquid-to-solid cooling rate of the welding process which is often as much as one hundred times faster than that of casting operations. This rapid solidification rate allows a maximum quantity of combined Mg2Si and free Mg to be put into this alloy and achieve maximum mechanical properties without fear of coarse Mg2Si particles precipitating during solidification.

The cooling rate that an aluminum alloy experiences after solidification down to room temperature is also critical for an alloy containing Mg2Si and excess Mg. Quench sensitivity is a term commonly used to describe the propensity for an aluminum alloy to precipitate alloy constituents such as Mg2Si as coarse particles in the metal matrix as the alloy cools. The metallurgy of the invention alloy composition was designed so as to create a quench sensitivity that was in concert with the cooling rates experienced in the welding process. Cu, Zn, and Fe increase the quench sensitivity of aluminum alloys and have been controlled to low levels in the invention alloys. The chemistry was further controlled to optimize the effects of thermal energy that is introduced by multiple welding passes. Fe in particular forms negative phases with any solidification and post solidification cooling rate and can only be controlled by chemistry restrictions. Therefore, the invention alloy composition has Fe content controlled to 0.20% maximum allowable which is below all other 4xxx and 5xxx AWS A5.10 filler metal alloy specifications.

For wrought 6xxx series alloys, the critical cooling rates to achieve full design strength specifications are known. For instance, the critical cooling rate to overcome the quench sensitivity of the alloy after solidification, that is the range from 850 to 400 degrees F., depends on the amount of Mg2Si present in the alloy. For an Mg2Si content of 0.8 to 1.1% by weight, the critical cooling rate is 100 degrees F. per minute. For an Mg2Si content of 1.4 to 1.6% by weight, the critical cooling rate increases to 1200 degrees F. per minute. If this cooling rate is not met, Mg2Si will precipitate into the structure as a relatively coarse phase and the mechanical properties of the alloy will be reduced. Therefore, the invention alloy is carefully designed to contain only 1.1 to 1.5% by weight of Mg2Si so as to meet the cooling rates experienced during welding operations as shown in FIG. 7. Again, because the invention alloy composition was designed to contain a maximum amount of free Mg without exceeding the limits required to control corrosion resistance, and knowing that the solubility of Mg2Si is decreased by the presence of free Mg, the control range for Mg2Si is tightly controlled. Even though the chemistry of the invention alloy composition is carefully controlled, due to the variability of the welding process and subsequent thermal treatment operations, the theoretical maximum mechanical properties may not be met in this alloy. In FIG. 4 the tensile strength of 5554 filler metal is compared to the tensile strengths of the Alloy of the invention that are shown as a band of post-weld tensile strengths achievable under most welding conditions and various levels of post-weld thermal treatments.

The melt-off rate of aluminum electrode is based on the welding parameters set into the welding equipment, the shielding gas, the mechanical stick out of the contact tip and electrode, and the physical properties of the electrode including the electrical resistivity of the metal in the electrode. Higher electrical resistivity provides increased heating of the wire as electricity is conducted through it. Higher resistivity of the electrode increases the melt-off rate. Further, aluminum is rarely used in the short-arc transfer welding mode. The resistivity is too low to provide a satisfactory burn-off rate during the short-arc portion of the metal transfer process. An objective of this invention is to increase the melt-off rate of the invention alloy composition in all metal transfer modes including globular, spray and short-arc transfer through increasing the resistivity. FIG. 5 shows the effect of alloying elements on conductivity. Resistivity is the reciprocal of conductivity. Consequently, conductivity changes with the addition of alloying elements to aluminum and correlates directly to the electrical resistivity of the resulting alloy. Pure aluminum such as alloy 1350 has a conductivity of 62% IACS (international annealed copper standard). For reference purposes, copper has a conductivity rating of 100% IACS and Iron is down at 18% IACS. A 1.5% Mg2Si alloy has a 49% IACS, a 3% Mg alloy a 40% IACS, and a 5% Mg alloy a 29% IACS value. If a typical 1.4% Mg2Si alloy with an electrical conductivity of 50% IACS has 2.8% Mg added to it, the resultant conductivity of the new alloy can be estimated and in FIG. 5 we show prophetic that estimated value to be 23% IACS. Specifically designed into this alloy is a conductivity that will yield increased melt-off rates. It should be noted that increased melt-off rate is a desired and intended result of this invention. In all metal transfer modes, including spray transfer, increased melt-off rates facilitate welding with a decreased requirement for heat input from the welding equipment thereby reducing the negative effects of reduced mechanical properties in the heat affected zone. Less structural distortion is produced with less heat input as well. Further, electrodes with higher burn off rates can be welded at higher transfer rates increasing welding speeds and thereby reducing welding costs. By increasing the melting rate of the invention alloy composition through increased resistance heating, the thermal energy needed in the arc plasma has been reduced thereby reducing the amount of Mg burn-off in the welding arc. Reduced heat input from the plasma due to increased resistance heating, allows for a more stable droplet transfer in the spray transfer mode, with less metal vaporization. The invention alloy composition reduces the amount or Mg vapors in the arc plasma and the undesirable condensation of these vapors alongside the weld in the form of vapor condensate, known as smut. It is believed that Mg vapors in the arc plasma affects the ionization potential of the shielding gas which gives a different arc characteristic to high Mg filler alloys as compared to other alloy series such as the silicon series filler metal alloys. Therefore, it is anticipated that the invention alloy will allow the use of reduced levels of shielding gas necessary to achieve quality welds.

The invention alloy composition was also developed to control its corrosion characteristics. The base metal alloys to be welded with this filler metal are used for automotive, truck trailer, rail car and ship building applications to name just a few. These structures spend their lives in harsh environmental atmospheres including the very corrosive effects of sea water. The corrosion characteristics of aluminum filler materials are carefully controlled to insure suitability in a variety of service environments. The invention alloy is specifically designed to have controlled and excellent corrosion resistance as welded.

FIG. 9 is a table showing the electro negativity of various aluminum alloy compositions. It shows two compositions, that of Al+1% Mg2Si and Al+5% Mg. They both have an electro negative potential very close to that of pure aluminum. Therefore, we believe that the chemical content we have designed into the invention alloy composition will have excellent as-welded corrosion performance. The invention alloy will have excellent salt water corrosion performance when welding the typical ship building sheet and plate alloys, 5052, 5086, 5083, 6061, 6082 and 6351.

FIG. 8 is a table showing the typical as-welded shear and tensile strengths of various aluminum welding filler metal alloys along with the shear and tensile properties that the invention alloy has. In industry, the number of partially penetrated fillet type welds far exceeds fully penetrated butt type welds. Shear strength is the primary factor considered in designing weld strengths for all partially penetrated welds. Fillet welds represent 70 percent of all structural welds. The invention alloy composition will provide significant increases in tensile, shear and fatigue strengths when compared to all of the other weld filler metal alloys in use today.

The invention alloy composition has been designed to reduce hydrogen solubility in molten aluminum weld beads. Increasing alloy content reduces the liquid solubility of hydrogen in aluminum alloys. Silicon reduces the solubility of hydrogen in aluminum to one half that of pure aluminum at the eutectic composition level. Welding specifications limit the amount of allowable hydrogen porosity in welds in order to control mechanical properties. The invention alloys contain substantially greater amounts of alloying elements that the weld filler metal alloys they are intended to replace. Consequently, they will have a lower propensity for hydrogen porosity contamination after welding. This is a specific design objective of this invention.

The invention alloy composition has the ability to be fabricated into wire. In embodiments where the alloys are formed into wire, such wire (i.e. welding filler metal) may be produced on spools for use in GMA welding or it may be cut into straight lengths for GTA welding. These are the two most common forms of aluminum filler metals, but they are not limited to these forms. Typically the linear wire or cut-to-length wire has a diameter of at least 0.010 inches and typically less than 0.30 inches in diameter. In preferred embodiments the wires have one or more diameters, such as 0.023 inches, 0.030 inches, 0.035 inches, 0.040 inches, 0.047 inches, 0.062 inches, 0.094 inches, 0.125 inches, 0.156 inches 0.187 inches, and 0.250 inches. The invention alloys is specifically designed to be able to be drawn into all of the required wire sizes while the Mg2Si matrix phase has been deliberately removed from solid solution through annealing. When the excess Mg in solution is limited to approximately 5.2%, Mn limited the range of 0.5 to 1.0% and the Mg2Si phase has been removed from solid solution, the resulting alloy has excellent mechanical cold-working properties.

What is claimed is:

1. An aluminum filler metal alloy with a magnesium silicide based 6xxx series alloy composition with excess magnesium for producing aluminum fusion welding filler metal electrodes and rods, consisting of:
   silicon in a weight percentage range of approximately 0.30% to 0.9%;
   manganese in a weight percentage range of approximately 0.05% to 1.2%
   magnesium in a weight percentage range of approximately 2.0% to 7.0%;
   chromium in a weight percentage range of approximately 0.05% to 0.30%;
   zirconium in a weight percentage range of approximately 0.05% to 0.30%;
   titanium in a weight percentage range of approximately 0.003% to 0.20%;
   boron in a weight percentage range of approximately 0.0010% to 0.030%;
   iron in a weight percentage maximum of 0.20%;
   copper in a weight percentage maximum of 0.10%;
   zinc in a weight percentage maximum of 0.30%;
   beryllium in a weight percentage maximum of 0.0003%;
   trace elements in a weight percentage maximum of 0.05% each, in a combined total maximum of 0.15%; and remainder aluminum.

2. An aluminum fusion welding filler metal alloy with a magnesium silicide based 6xxx series alloy composition with excess magnesium for producing aluminum filler metal electrodes and rods, consisting of:
   silicon in a weight percentage range of approximately 0.50% to 0.70%;
   manganese in a weight percentage range of approximately 0.50% to 1.0%;
   magnesium in a weight percentage range of approximately 5.7% to 6.1%;
   chromium in a weight percentage range of approximately 0.05% to 0.20%;
   zirconium in a weight percentage range of approximately 0.05% to 0.15%;
   titanium in a weight percentage of approximately 0.003% to 0.10%;
   boron in a weight percentage of approximately 0.0010% to 0.010%;
   iron in a weight percentage maximum of 0.20%;
   copper in a weight percentage maximum of 0.10%;
   zinc in a weight percentage maximum of 0.10%;
   beryllium in a weight percentage maximum of 0.0003%;
   trace elements in a weight percentage maximum of 0.05% each, in a combined total maximum of 0.15%; and remainder aluminum.

3. An aluminum filler metal alloy with a magnesium silicide based 6xxx series alloy composition with excess magnesium for producing aluminum filler metal electrodes and rods consisting of:
   silicon in a weight percentage range of approximately 0.30% to 0.50%;
   manganese in a weight percentage range of approximately 0.50% to 1.0%,
   magnesium in a weight percentage range of approximately 3.4% to 3.7%;
   chromium in a weight percentage range of approximately 0.05% to 0.20%;
   zirconium in a weight percentage range of approximately 0.05% to 0.15%;
   titanium in a weight percentage of approximately 0.003% to 0.10%;
   boron in a weight percentage of approximately 0.0010% to 0.010%;
   iron in a weight percentage maximum of 0.20%;
   copper in a weight percentage maximum of 0.10%;
   zinc in a weight percentage maximum of 0.10%;
   beryllium in a weight percentage maximum of 0.0003%;
   trace elements in a weight percentage maximum of 0.05% each, in a combined total maximum of 0.15%;
   and remainder aluminum.

4. A 6xxx series aluminum filler metal electrode and rod according to claim 3 such that after welding the weld bead contains Mg2Si precipitates, such that it can be used in elevated temperature applications up to 250 degrees F., yielding as-welded weld bead tensile strengths of 40 ksi, as-welded yield strengths of 20 ksi, and as-welded shear strengths of 24 ksi.

5. A weld joint produced by fusion welding using 6xxx series aluminum welding electrode or rod with a chemical composition according to claim 1, or claim 2, or claim 3 containing Mg2Si in the form of a fine precipitate, with a residual amount of Si plus Mg remaining in solid solution which is then post-weld aged to produce additional precipitation and coalescence of Mg2Si in the microstructure.

6. The alloy composition according to claim 1, or claim 2, or claim 3 wherein the chemistry is controlled to allow cast redraw rod produced from it to be cold worked by drawing into welding wire having a diameter of 0.023 inches or larger.

* * * * *